United States Patent [19]
Howard

[11] 3,967,146
[45] June 29, 1976

[54] MAGNETIC MOTION CONVERSION DEVICE

[76] Inventor: Gerald T. Howard, Rte. 6 Box 606, Augusta, Ga. 30906

[22] Filed: May 5, 1975

[21] Appl. No.: 574,457

Related U.S. Application Data

[63] Continuation-in-part of Ser. No. 463,685, April 24, 1974, abandoned.

[52] U.S. Cl. .............................. 310/80; 310/103; 310/24
[51] Int. Cl.² ...................................... H02K 7/06
[58] Field of Search ................. 310/24, 23, 80, 103

[56] References Cited
UNITED STATES PATENTS

| | | | |
|---|---|---|---|
| 3,636,391 | 1/1972 | Horner et al. | 310/24 |
| 3,703,653 | 11/1972 | Tracy et al. | 310/24 |
| 3,811,058 | 5/1974 | Kiniski | 310/80 |
| 3,879,622 | 4/1975 | Ecklin | 310/80 |
| 3,899,703 | 8/1975 | Kinnison | 310/103 |

Primary Examiner—Donovan F. Duggan
Attorney, Agent, or Firm—Watson, Cole, Grindle & Watson

[57] ABSTRACT

A motor utilizing permanent magnets or electromagnets wherein the magnets are arranged with like poles facing one another in a normally repelling position. A magnetic flux field suppressor having a non-magnetic portion and a magnetically permeable portion is disposed between the magnets for repeatedly causing a magnetic repelling and attracting action as each portion of the suppressor is repeatedly moved into alignment between like poles of the magnets. The magnetically permeable portion is comprised of a plurality of magnetically permeable sheets interleaved with thin layers of a non-magnetic material. During the attracting action the magnetic flux lines of each magnet are conducted within a confined pathway by the sheets as they are directed therethrough between the magnet poles. The motor may be constructed for both reciprocating and rotary operation.

7 Claims, 6 Drawing Figures

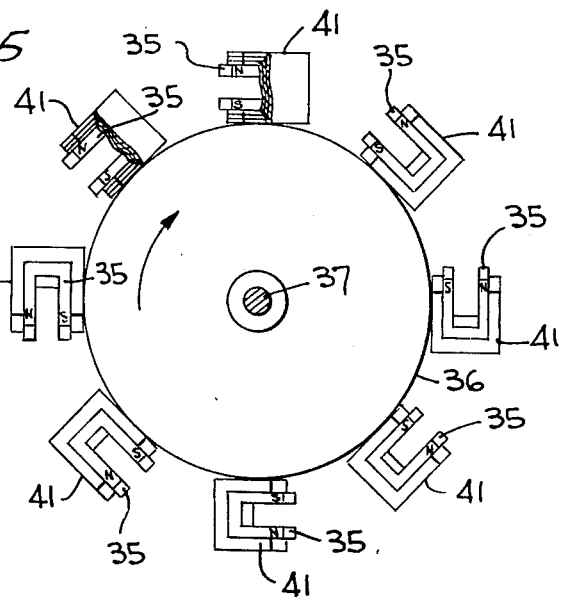
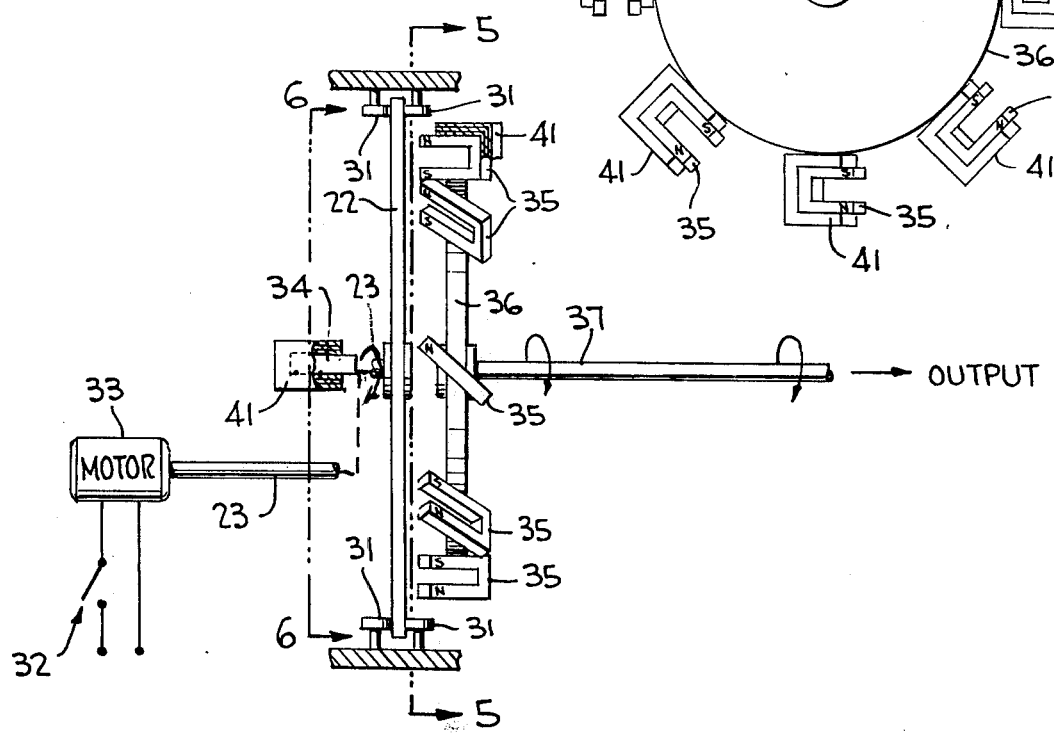
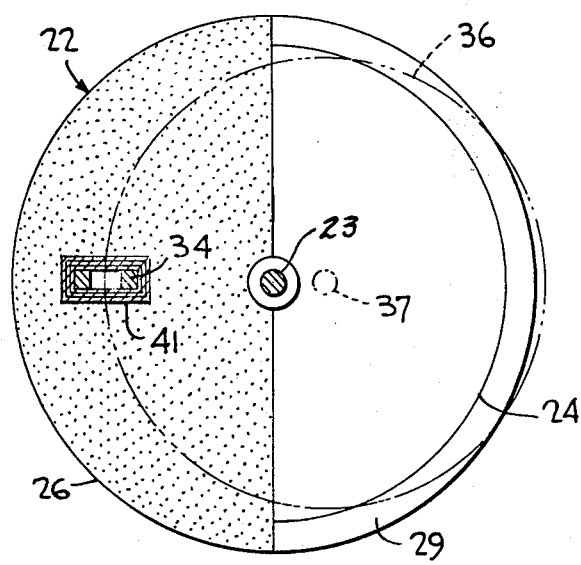

MAGNETIC MOTION CONVERSION DEVICE

This is a Continuation-In-Part of U.S. Ser. No. 463,685, filed Apr. 24, 1974; now abandoned. This invention relates generally to motors utilizing the magnetic repelling and attracting forces of permanent magnets or electro-magnets as a power component, and more particularly to such a motor as including a rotary suppressor or disc disposed between like poles of facing magnets for effectively directing or focusing the magnetic flux lines of each magnet therethrough during the attracting action therebetween.

The normally repelling action between permanent magnets with like poles facing one another can be taken advantage of to effect a reciprocating or a rotary operation of a motor using magnetic forces as a power component, and the magnetic attracting action between the magnets and disc is also made available for the power output. The magnets may operate as pistons connected in a reciprocating manner connected to a drive shaft, or a rotor and stator arrangement may be devised using the repelling and attracting forces to effect a rotary operation. This repelling action between magnets with like poles facing each other is converted into an attracting action between the magnets and disc by means of a rotatable disc, called a magnetic flux field suppressor, disposed between the facing magnets. One-half the disc is of a non-magnetic material such as aluminum, plastic material, or the like, and the other half thereof is made up of a plurality of stacked magentic conducting sheets interleaved with thin layers of non-magnetic material. The non-magnetic half permits passage of the magnetic flux lines between the magnets when in alignment therwith whereby the normally repelling action between the magnets is assured. The magnetically permeable half of the disc, on the other hand, serves to direct the magnetic flux lines between unlike poles of each individual magnet along the magnetic conductor sheets when in alignment between the magnets so as to permit an attracting action between the magnets and the conductor half of the disc or suppressor half. The magnetic suppressing half of the disc therefore smoothly guides or focuses the flux lines of each magnet between their respective poles without abruptly cutting across these flux lines during rotation of the magnetic flux field suppressor. The disc rotates in a plane essentially parallel to the focused flux fields and rotates generally down the length of the flux lines.

The foregoing represents the principal object achieved by the present invention.

A further object of this invention is to provide such a motor as aforedescribed being in the form of a rotary-type motor wherein a magnet or magnets of the stator have their like poles facing the poles of magnets mounted on a rotor, the suppressor disposed therebetween is connected to a driven shaft the rotation of which permits a repelling action between facing magnets and attracting action on the disc by the magnets to thereby cause a turning movement of the rotor. The magnets on the rotor and/or stator may be disposed angularly thereon with poles towards one another.

A still further object is to provide a permanent magnet motor of the rotary or reciprocating type wherein each of the magnets may be partially encased within a cover comprised of a plurality of magnetic conducting sheets interleaved with thin layers of non-conducting material, the cover action as a magnetic flux field suppressor which prevents any flux lines of adjacent magnets from interfacing with one another.

Other objects, advantages and novel features of the invention will become more apparent from the following detailed description of the invention when taken in conjunction with the accompanying drawings wherein:

FIG. 4 is a plan view of the rotary-type motor in accordance with the present invention;

FIG. 5 is a view of the rotor taken along line 5—5 of FIG. 4; and

FIG. 6 is a sectional view through one of the magnets showing a typical sheel partially encasing each magnet, taken along line 6—6 of FIG. 4.

Figure 1:
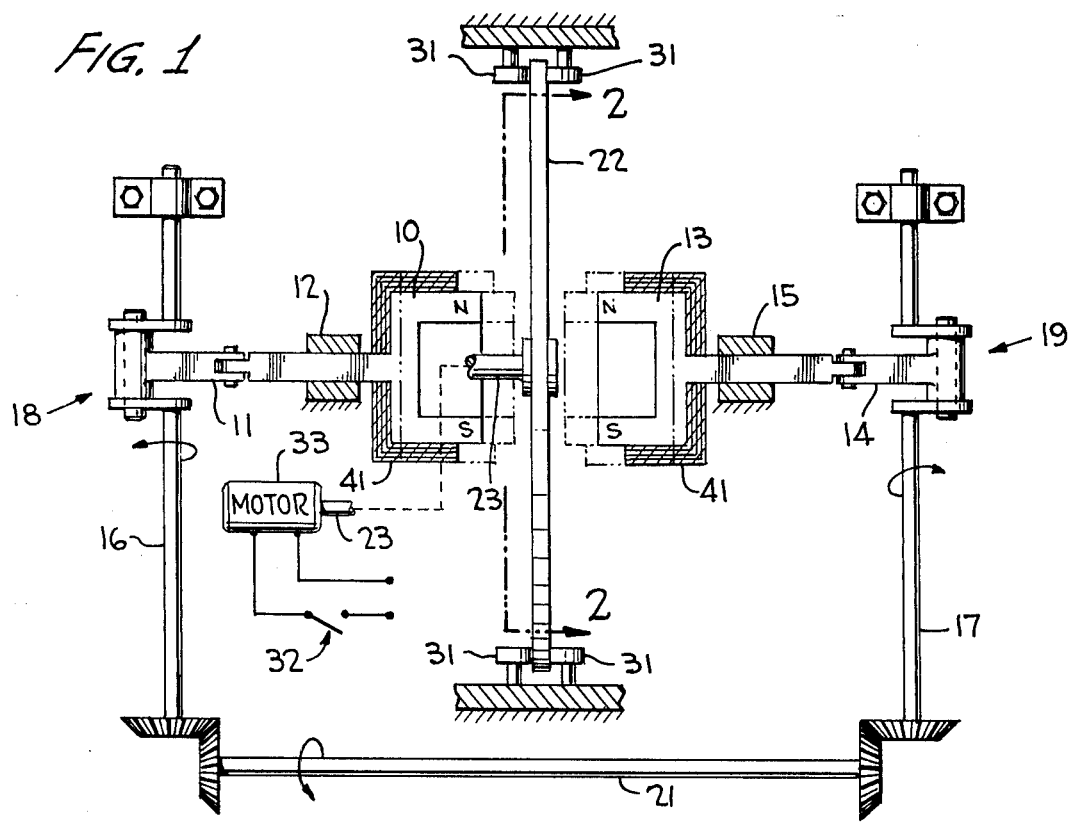
FIG. 1 is a plan view of a reciprocating-type motor in accordance with the present invention.

Turning now to the drawings wherein like reference characters refer to like and corresponding parts throughout the several views, a reciprocating-type motor of the invention is shown in FIG. 1 as including a permanent magnet or electromagnet 10 typically of the horseshoe or U-shaped variety mounted on a rectangular piston rod 11 for reciprocating movement within a stationary rectangular guide 12. A permanent magnet or electromagnet 13, similar to that of magnet 10, is mounted on its piston rod 14 for reciprocating movement within stationary guide 15. The magnets are therefore prevented from turning during their reciprocating movements. The piston rods are coupled to their respective crankshafts 16 and 17 in any normal manner as at 18 and 19, and the crankshafts are interconnected by a gear arrangement to a common drive shaft 21 serving as a main output shaft for the reciprocating motor. Shafts 16 and 17 may also be used as power output shafts.

Figure 2:
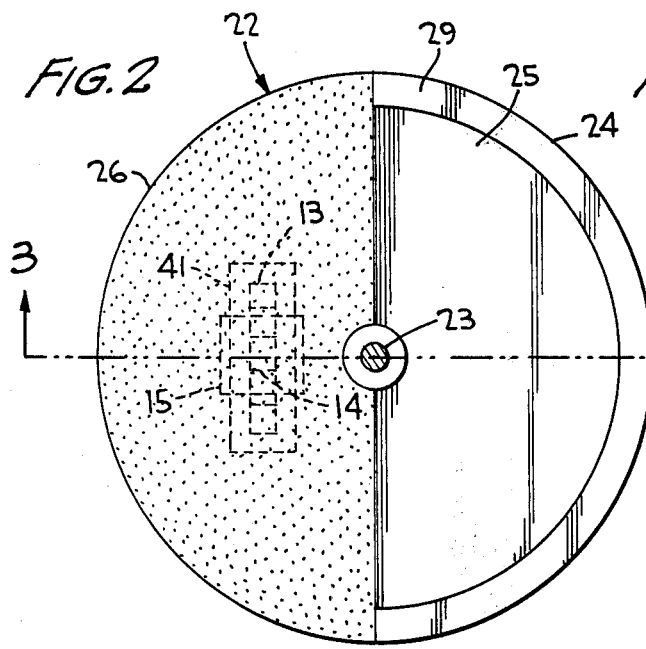
FIG. 2 is a view of the suppressor or disc taken along line 2—2 of FIG. 1.

Magnets 10 and 13 are disposed with like poles thereof facing one another, and a magnetic flux field suppressor in the form of a disc 22 is located therebetween. This disc is fixedly mounted on a central shaft 23 which is coupled to a motor 33 or other power source to effect rotation of shaft 23 and disc 22 when switch 32 is closed. As seen in FIG. 2, this central shaft is offset from aligned piston rods 11 and 14.

One-half the disc forms a non-magnetic first portion 24 comprised essentially of aluminum, lead, plastic material 25, or the like, or an open or air space. The remaining half of the disc forms a second portion 26 formed of a plurality of nonpermanent magnetic ferrous material or other type of magnetic sheets 27 interleaved with thin layers 28 of non-magnetic material 28 in the form of either aluminum, wood, organic or inorganic resins, or the like. Also, a strip 29 of lead of other dense material is provided at the periphery of the non-magnetic material 25 of the first portion so as to counterbalance the weight of second portion 26 of the disc. Disc 22 manipulates the fields of magnets 10 and 13 as it rotates such that the fields alternately expand through section 24 and then flow along section 26 in parallel lines.

Roller bearings 31 are suitably mounted in place along the periphery of disc 22 in rolling contact with opposite sides thereof, as shown in FIG. 1. Accordingly, any uneven or wobbling movement of the disc during its rotation with the magnetic forces of the magnets acting thereon and therethrough is substantially avoided.

When the pistons of the reciprocating-type motor of FIG. 1 are at rest before operation commences, magnets 10 and 13 are disposed with their like poles facing one another in a position shown in solid outline in the FIGURE. The magnets are repulsed in this position away from one another since first portion 24 of the disc is in alignment therewith before any movement of the motor elements commences. When switch 32 of motor 33 is closed, rotation of disc 22 commences. As the second portion 26 of the disc is moved into alignment with the magnets during disc rotation, the magnets are attracted magnetically to sheets 27 so that they are both moved toward one another to begin the attraction stroke of the pistons. Continued rotation of the disc thereafter places first portion 24 back into alignment with the magnets so as to cause them to repulse and move away from one another during the normally repelling action between magnetic flux lines. This reciprocating magnet movement continues in such manner each time the first and second portions of the disc are rotated into alignment therewith unless the load on the device exceeds the output power of the magnetic components. The magnetic sheets 27 of the disc's magnetically permeable portion 26 restrict and conduct the flux lines of both magnets and induce the fields of the magnets to travel in very close proximity to one another without touching through these sheets which in effect act as focusing pathways for the magnetic flux lines to saturate and move through. This repeating attracting and repelling action of the magnets will continue throughout the usable life of the magnets, and the disc will likewise continue to rotate by reason of its connection with motor 33. The pathways provided by sheets 27 smoothly guide the magnetic lines of force essentially parallel therealong without abruptly cutting through such lines as the disc turns. Accordingly, little resistance is offered to the turning movement of the disc by the flux lines passing through sheets 27 between opposite poles of each magnet.

FIG. 4 illustrates another embodiment of the invention, wherein a rotary action between a rotor and a stator is effected using the same principles as descirbed above. Here, an electromagnet or a permanent horseshoe-type magnet 34 is fixedly mounted on one side of disc 22. As shown in FIG. 6, the disc is identical to that shown in FIG. 2 described for the earliest embodiment. Also, shaft 23 of the disc is offset from aligned pairs of magnets 34 and 35 in a manner similarly as described with reference to FIG. 1. Roller bearings 31 are likewise provided for stabilizing the disc during its rotational movement.

In this embodiment, a plurality of permanent horseshoetype magnets 35 are equally spaced along the periphery of a support plate 36, each of these magnets being mounted in place at an angle to shaft 37 of the plate. More specifically, magnets 35 are mounted at an angle to the axis of magnet 34 similar to the blades of a windmill which are mounted at an angle to the line of travel of the approaching wind. Shaft 37 of the rotor is the power output. Shaft 37 rotates when suppressor 22 rotates but only so long as the load on shaft 37 is less than the power output from rotor 36. Also, disc 22 is coupled to a power source such as motor 33 to effect rotation of shaft 23 and disc 22 when switch 32 is closed.

As shown in FIG. 4, the poles of stationary magnet 34 lie in the same horizontal plane near one side of disc 22. The north and south poles of each magnet 35 respectively lie radially outwardly and inwardly of one another along the disc periphery, so that like poles between magnets 34 and 35 face one another when in an aligned position. Shaft 37 is offset from shaft 23 and from magnet 34 so as to effect such aligned position. The non-magnetic first portion 24 of the disc allows the normally repelling action between magnets 34 and 35 to take place when this first portion is in alignment therebetween. As in the FIG. 1 embodiment, this repelling action is converted into an attracting action between magnets 35 and disc 22 as the magnetic material in portion 26 of the disc is rotated into alignment between magnets 34 and rotor 36. This intermittend repelling and attracting can therefore be seen to effect a rotational movement of shaft 37 in the direction of its arrow as magnets 35 are pushed in that direction by magnet 34 when moved slightly beyond alignment with magnet 34. In other words, the magnetic material contained in portion 36 of the rotating disc attracts each of magnets 35 thereto and, in so doing, causes movement of support plate 36 in the direction of the shaft 37 arrow. During such attracting action, each magnet 35 is moved substantially into alignment with stationary magnet 34. Now, as the non-magnetic portion 24 of the rotating disc moves into alignment with magnet 34, the repelling action between 34 and 35 causes plate 36 to continue its rotation. The angular disposition of each magnet 35 on rotor 36 insures that the repeated repelling and attracting action translated to rotor 36 will cause a continuous rotational movement of shaft 37. Magnetic sheets 27 of the magnetically permeable portion 26 of the disc serve as guides or pathways for the flux lines of the magnets during the attracting action thereof, similarly as described with reference to FIG. 1.

Figure 3:
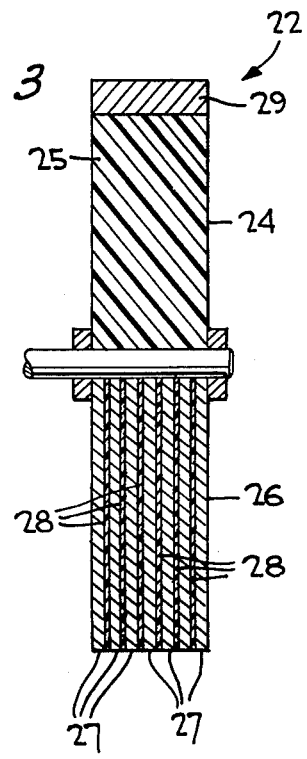
FIG. 3 is a sectional view of the disc taken along line 3—3 of FIG. 2.

As seen in FIG. 4, each of the magnets 35 as well as magnet 34 may be paritally encased within a shell 41. This shell, which is in effect a five-sided cube having an open side for the magnetic poles, is likewise provided for magnets 10 and 13 of the FIG. 1 embodiment. Several of these shells are shown in FIGS. 4 and 5 as partially broken away for the purpose of clarity. Although the shells are only schematically shown, it should be noted that each of them comprises a plurality of magnetic sheets such as 27 interleaved with thin layers of nonconducting material 28, in a manner identical to that shown in FIG. 3 for the permeably magnetic portion 26 of the disc. Each sheel therefore shields adjacent magnets 35 from any magnetic flux lines therebetween. Any cross-interference by such flux lines between these adjacent magnets is therefore substantially avoided.

From the foregoing it can be seen that a simple yet highly effective and efficiently operating permanent magnet or electromagnet motor has been devised for both reciprocating and rotary action. A rotating disc 22 referred to as a magnetic flux field suppressor is used to effect reciprocating movement between facing magnets as in the FIG. 1 embodiment, and is likewise used to effect a rotary action between a stationary magnet(s) and magnets such as 35 which revolve relative to the stationary magnet or magnets, as in the FIG. 4 embodiment.

The magnetic leaved portion 26 of this suppressor serves to direct or focus the magnetic flux lines generated by the facing magnets in such a manner that these flux lines are focused parallel to and close between the poles of each magnet without interfering with one another through the magnetic sheets 27. Very little force is required for the turning of disc 22 since the non-permanent magnetic material of the plates of the disc are actually moved parallel to the path of the flux lines between poles of the magnets so as to conduct but not to cut across such lines. The disc or suppressor alternately permits passage of the magnetic fields through the non-magnetic portion 24 thereof when in alignment between facing magnets. The magnetically permeable portion 26 of the disc, on the other hand, restricts these flux lines between facing magnets by reason of the magnetic line conductors thereof interleaved with thin strips of non-magnetic material. The lines of force of each magnet are therefore not projected outwardly from the face thereof as far as in the normal manner, but are induced to leave their normal trajectory to travel in close to the proximity of one another through sheets 27 which are essentially saturated. The casing or shell 41 for each magnet likewise induces the flux lines thereof to be confined in close proximity to its magnet so that adjacent magnets on the rotary portion and/or the stator portion of the motors can be in close proximity without the likelihood of interference of flux lines therebetween. The constant attracting of magnets to the disc and repelling action between facing magnets in the FIG. 4 embodiment effects a rotation of shaft 37 and alternately the main power output shaft 37. The multiple magnets in both of these embodiments are angularly mounted with their poles facing outwardly of their support plates much in the manner of a common windmill so as to insure a smooth and continuous repelling and attracting action between the components.

Sheets 27 forming the magnetically permeable portion of the disc and likewise forming shell 41 partially encasing each of the magnets may be of ferrous material or a superconducting material such as Permalloy interleaved with nonconducting material 28 such as shellac, wood, aluminum, lead, organic resins such as epoxy resins or polyester resins, or some other type of non-magnetic material. Any number of sheets 27 may be provided as desired, and layers 28 may be approximately 1 mm thick. These magnetic sheets therefore function to direct or focus the normally curved magnetic flux fields so that sheets 27 nearest the magnet tend to concentrate the field and tend to be saturated near the magnet so that the magnetic field is held in the maximum close proximity to the magnetic poles as possible. A solid magnetic material would not have the ability as a single piece to effectively concentrate a field as much as multiple sheets, and a solid metal would have to be much thicker to limit and contain all of the flux fields. In such manner, the magnetic fields between facing magents as well as between adjacent magnets by reason of the similarly constituted shells do not interfere with one another. They can therefore be diposed quite close to each other without the likelihood of magnetic interference between magnetic fields. When portion 26 is in between the magnets, the magnets are attracted to the disc and can approach each other closely without their fields repulsing each other. The poles of the magnets protrude from their shells so as to prevent the frontal flux fields from collapsing because of the too close proximity of the shells to the face of the magnets.

Permanent magnets such as bar shapes can be alternatively used in lieu of the horseshoe-type shown herein without departing from the invention. Also, the permanent magnets may be of the alnico, ceramic, eletromagnets, or other types known in the art.

Obviously, many other modifications and variations of the present invention are made possible in the light of the above teachings. It is therefore to be understood that within the scope of the appended claims, the invention may be practiced otherwise than as specifically described.

What is claimed is:

1. A motor comprising at least one first magnet and at least one second magnet disposed with like poles facing one another, at least one of said first and second magnets being shiftable in a reciprocating motion relative to the other of said magnets, a magnetic flux field suppressor moveably mounted between said magnets, said suppressor comprising at least one disc having a first portion of non-magnetic material and a magnetically permeable second portion comprising a plurality of magnetic conducting sheets interleaved with thin layers of a non-magnetic material, first means including a crankshaft connecting said one magnet to a drive shaft, second means connecting said disc to a power source to effect driving movement of said disc, whereby repeated movement of said first and second portions of said disc into alignment between like poles of said magnets causes them to be repeatedly repulsed from each other and attracted to the disc to thereby shift said one magnet relative to said other magnet, the magnetic flux lines of said magnets being focused during the attracting action by said sheets as they are directed therethrough between the poles of each said magnet so that said magnets are attracted to the disc and not to each other.

2. The motor according to claim 1 wherein both of said magnets are shiftable relative to one another in a reciprocating motion, third means being provided connecting said other magnet to said drive shaft, and said first and third means including crankshafts.

3. The motor according to claim 1 wherein said one magnet is connected to a rotor for rotary movement in synchronization therewith.

4. The motor according to claim 3 wherein a plurality of said second magnets are equally spaced along the periphery of said rotor, said second magnets each being angularly mounted thereon.

5. The motor according to claim 3 wherein each of said magnets is partially encased within a shell comprised of a plurality of magnetic sheets interleaved with thin layers of non-magnetic material, the ends of said magnets protruding outwardly from their shells and each said shell preventing any flux lines between adjacent ones of said second magnets from interfering with one another.

6. The motor according to claim 4 wherein each of said first and said second magnets is partially encased within a shell comprised of a plurality of magnetic sheets interleaved with thin layers of non-magnetic material, the ends of said magnets protruding outwardly from their shells and each said shell preventing any flux lines between adjacent ones of said first and said second magnets, respectively, from interfering with one another.

7. The motor according to claim 1 wherein each of said magnets is partially encased within a shell comprised of a plurality of magnetic sheets interleaved with thin layers of non-magnetic material, the ends of said magnets protruding outwardly from their shells and each said shell preventing any flux lines between adjacent ones of said second magnets from interfering with one another.

* * * * *